United States Patent [19]

Newell et al.

[11] 3,967,812
[45] July 6, 1976

[54] SHAFT SEAL FOR CORROSION RESISTANT BUTTERFLY VALVE

[75] Inventors: Fred T. Newell; Gerald B. Smith, both of Bradford, Pa.

[73] Assignee: Dresser Industries, Inc., Dallas, Tex.

[22] Filed: Feb. 26, 1975

[21] Appl. No.: 553,365

[52] U.S. Cl. ............................... 251/214; 251/306; 277/205
[51] Int. Cl.² ......................................... F16K 31/44
[58] Field of Search ............ 137/375; 251/214, 286, 251/304, 305, 306, 307, 308; 277/205, 206.1, 235

[56] References Cited
UNITED STATES PATENTS

| | | | |
|---|---|---|---|
| 2,983,533 | 5/1961 | Tisch | 277/206.1 |
| 3,329,398 | 7/1967 | Goldsmith | 251/306 |
| 3,425,439 | 2/1969 | Duffey et al. | 251/308 |
| 3,469,855 | 9/1969 | Enting | 277/235 |
| 3,517,689 | 6/1970 | Roos | 251/306 |
| 3,656,712 | 4/1972 | Bertrem | 251/306 |
| 3,750,698 | 8/1973 | Walchle et al. | 137/375 |
| 3,771,763 | 11/1973 | Myers | 251/306 |
| 3,776,509 | 12/1973 | Leblond | 251/306 |

FOREIGN PATENTS OR APPLICATIONS 1,217,150   12/1970   United Kingdom ................ 251/306

*Primary Examiner*—Martin P. Schwadron
*Assistant Examiner*—George L. Walton
*Attorney, Agent, or Firm*—Daniel Rubin

[57] ABSTRACT

A valve, such as a butterfly valve, having an offset closure vane supported on stub shafts for operating the vane in the flow passage of the body, has all exposed and/or potentially vulnerable metal surfaces encapsulated in a corrosion resistant polymeric plastic coating. Annular seals of resilient composition bonded to a steel insert are formed with an annular radial recess at an axially intermediate location and are positioned on the vane shafts axially squeezed between vane and body bosses thereat. In this arrangement, controlled deflection is provided by the seals in effecting a positive sealing pressure whereby the shafts are protected against exposure to line content. At the same time, the seals are rendered self-packing in response to pressure of line content while also functioning to assure concentric centering of the vane in the body passage.

10 Claims, 4 Drawing Figures

SHAFT SEAL FOR CORROSION RESISTANT BUTTERFLY VALVE

CROSS REFERENCE TO RELATED APPLICATIONS

"Corrosion Resistant Valve Construction", Ser. No. 526,209 filed Nov. 22, 1974 in the names of R. J. Al and R. E. Henry and incorporated herein by reference.

BACKGROUND OF THE INVENTION

The field of art to which the invention pertains comprises the art of valves including liners and protectors therefor.

The prior art to which the invention is directed includes the art of valves and particularly butterfly valves being a type in which a usually circular closure vane or disc is mounted either centralized or offset for rotation in the body flow passage between an open and closed position. Construction for such valves commonly consists of a body and/or closure vane of cast iron or the like operable by means of an operator shaft extending through a bore in the body wall to externally thereof. Where the valve is likely to be utilized in corrosive service, the more corrosion vulnerable components and sometimes the entire valve is constructed of more exotic and more expensive materials such as stainless steel. As an alternative less costly construction, a recent trend in the industry for achieving corrosion protection has been to apply either a protective polymeric coating and/or a detachable liner about those components or surface portions susceptible to corrosive attack by the line content for which the valve is to be used. Exemplifying such prior art type butterfly valves for corrosive service of both the centralized and offset variety are U.S. Pat. Nos. 3,801,066; 3,563,510; 3,425,439; 3,376,014; 3,241,806; and 3,076,631.

Notwithstanding the added benefits which such protective coatings or liners afford, a problem which has thus far escaped a ready solution has been a satisfactory corrosion protection for the operator shafts per se. The problem is particularly acute with the offset or double offset variety of vane mounting in a butterfly valve as compared to a centralized mounting because of the increased exposure and vulnerability afforded the shafts in the former. Where a dynamic seal is employed to protect the shafts, the risk of leakage is minimized but not eliminated rendering the shafts ultimately vulnerable to attack. Yet, failure to protect the shafts in one form or another will eventually lead to destruction of the valve. For that reason and for lack of a less costly alternative, a frequent shaft construction for such service has been to utilize more costly and exotic corrosion resistant materials such as stainless steel.

SUMMARY OF THE INVENTION

The invention relates to valves and more particularly to butterfly valves for corrosion resistant service. In accordance herewith, a continuous plastic coating of corrosive resistant composition is completely bonded to the valve body throughout in the manner disclosed in the cross-referenced application supra. In addition thereto, there is included resilient seals of controlled deflection situated on the vane shafts axially squeezed between the vane and body bosses thereat to effect a positive sealing pressure while affording concentric centering of the vane relative to the thru-port opening.

This is achieved in accordance herewith by bonding the seal elastomer to a metal insert which enables axial but not radial deflection. By means of a peripheral surface contour having an annular radial recess at an intermediate axial location, the seals are rendered self-packing in response to line pressure in order to reliably protect the shafts against exposure thereto. Not only is overall corrosion protection reliably enhanced in this manner as to eliminate previous need for more costly stainless steel shafts but at the same time it enables permanent lubrication which maximizes bearing life while minimizing the possibility of shaft freezing from line content intervening in and about the clearances thereat. The virtues thereof should be instantly apparent in both the enhanced protection with reduced cost of manufacture and maintenance which this construction affords as compared to previous constructions utilized for such purposes.

It is therefore an object of the invention to provide a novel valve construction for corrosive line service.

It is a further object of the invention to provide a corrosion resistant valve construction for a trunnion operated valve including novel seals for protecting the vane shafts against exposure to line content.

It is a further object of the invention to effect the previous object with a seal construction that is self-packing in response to line pressure while also able to enhance bearing life thereat.

It is a still further object of the invention to effect the foregoing objects with a relatively uncostly seal construction for readily achieving corrosion protection for the vane shafts as to enable a less costly shaft composition to be employed as compared to similar purpose constructions of the prior art.

Figure 1:
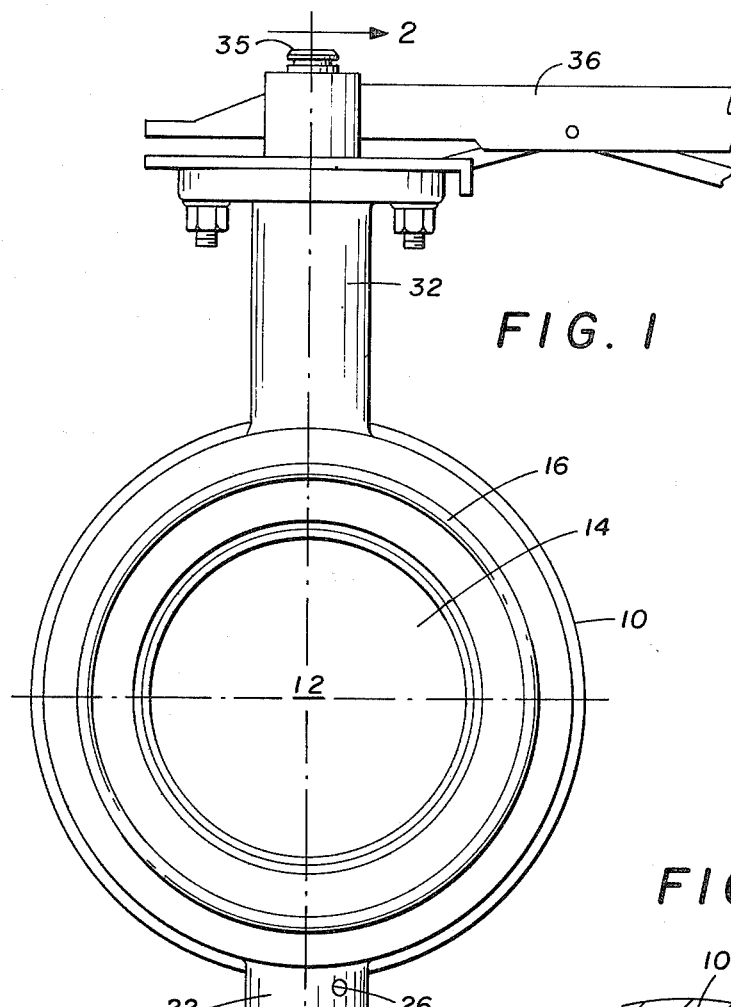
FIG. 1 is a front elevation of wafer-type butterfly valve in accordance herewith.
Figure 2:
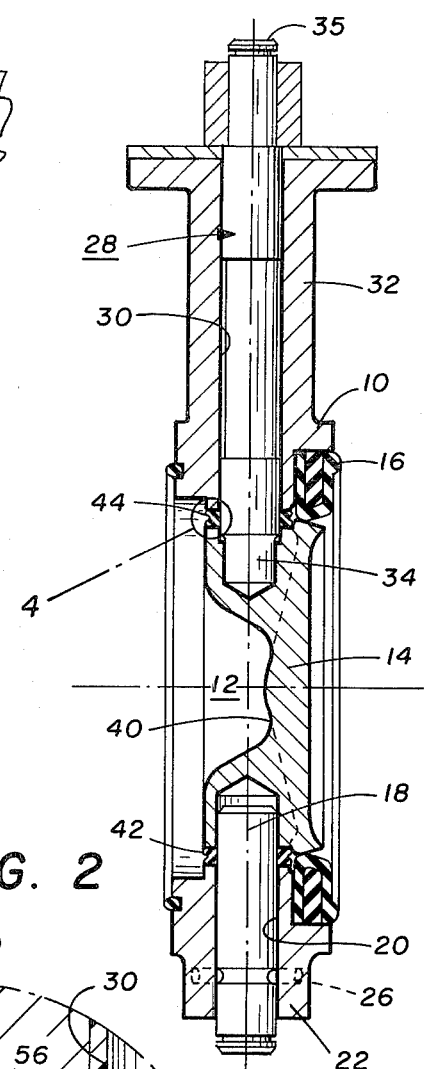
FIG. 2 is a sectional view taken substantially along the lines 2—2 of FIG. 1.

Referring now to the drawings, there is illustrated a wafer-type butterfly valve formed of a cast iron ring-like body 10 defining a central flow passage 12. Contained within passage 12 is an offset or double offset closure vane 14 mounted for rotation on trunnion stub shafts 18 and 28. For closing the passage to fluid flow, vane 14 cooperates with an annular resilient thrupart seal 16 in a well known manner. Stationary stub shaft 18 contained in body bore 20 extending outward through boss 22 supports vane 14 at the underside of the valve. A cross pin 26 transversely extending through shaft 18 secures it in position against axial movement. Operator shaft 28, extending from a rotational interlock with the vane through bore 30 of integral body neck 32 to outward thereof supports vane 14 on its topside. Both shafts 18 and 28, for reasons as will be understood, are preferably of an inexpensive composition such as carbon steel and where the latter rotationally interlocks with the vane at its underside 34 it is of hexagonal or other suitable cross section able to effect a driving connection therewith. At its top end 35, shaft 28 is sectionally shaped to accommodate a suitable operator 36 whereby the valve can be manually or power opened or closed as required.

The entire body and vane are preferably provided with a moisture impervious, resilient, polymeric coating 40 bonded to the metal surfaces, including the surfaces of shaft bores 20 and 30. Coating 40 can comprise either a thermoplastic or thermosetting composition characterized by good chemical and impact resistance and may include such polymeric compositions as nylon, polyethylene, polypropylene, polyurethane, polyvinyl chloride (PVC) or the like. For purposes hereof, nylon has been found preferable.

For affording corrosive protection to shafts 18 and 28, there is provided in accordance herewith a pair of annular resilient seals 42 and 44 encircling shafts 18 and 28, respectively, at locations intervening between the vane and body boss surfaces thereat. Each of these latter seals is constructed of a suitable elastomer 46 such as Buna-N or the like. Suitably bonded or otherwise secured within the elastomer as to per se be protected from line content and in abutting sliding relationship with its supporting shaft is a centrally located rigid insert 48 of carbon steel or the like. The insert is preferably of width "Y" on the order of about 1/32 inches and radial thickness "X" on the order of about ⅛ inches effective to permit flexibility of the elastomer in an axial direction but substantially if not completely precluding flexibility in a radial direction. Where required for protection of the elastomer, an additional coating or jacket (not shown) such as Teflon or the like can be applied about the exposed surfaces thereof.

Figure 4:
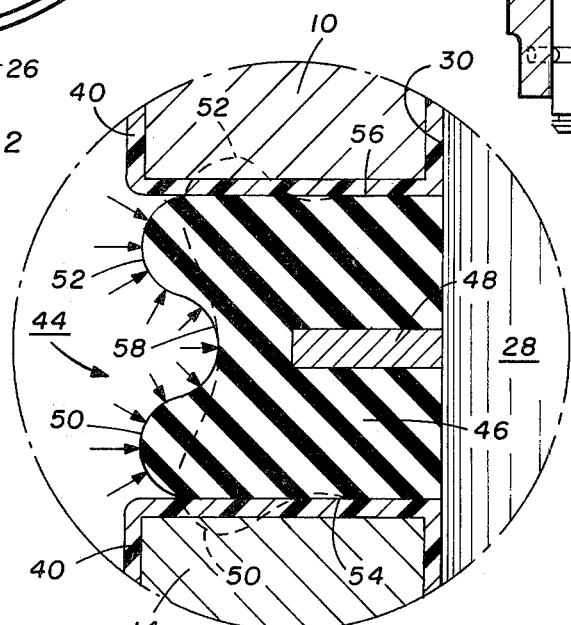
FIG. 4 is a fragmentary enlargement of the encircled portion of FIG. 2.
Figure 3:
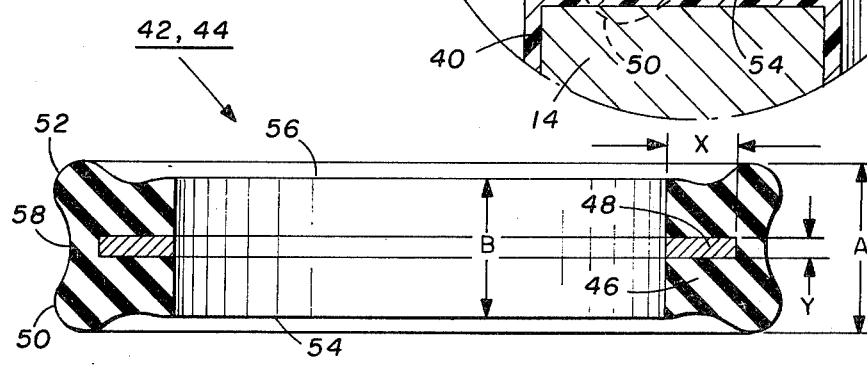
FIG. 3 is a sectional view through the seal construction hereof.

Essential to the purposes hereof is that seals 42 and 44 as molded in their natural state (FIG. 3) have an axial width "A" at its periphery which decreases inwardly to a width "B" or slightly less than "B" in order to accommodate assembly and insure adequate axial squeezing when assembled (FIG. 4). In a useful embodiment it was practical to construct the seals with a dimension "A" of about 0.275 inches and a dimension "B" of about 0.225 inches. Likewise essential is the annular contour of alternately changing surface diameters defined in an axial direction by lobes 50 and 52 separated by an intervening inwardly extending radial recess 58 and initially of winged or bowed configuration in extending axially outward of side faces 54 and 56. By this construction as seen in FIG. 4, seal 44 is axially squeezed from its natural contour shown in phantom to its operative contour in assembly shown solid. An effect of the squeeze is to significantly increase the radial depth of annular recess 58 enabling line pressure, represented by the plurality of arrows, to act against the surfaces thereat in producing a self-packing action of the seals against the adjacent coatings 40. Because of the axial sealing this arrangement affords, shafts 28 and 18 are completely isolated from line content enabling a less costly shaft material to be employed without regard to its corrosive properties and without sacrifice in life expectancy or other operating virtues for which stainless steel has previously been required. Should the vane be installed in a vertical position, the seals with this construction are likewise able to provide sufficient rigidity for supporting vane 12.

By the above description there is disclosed a novel valve construction affording enhanced corrosion protection for a butterfly valve completely protecting the vane shafts as to enable a less expensive shaft composition to be employed. By use of the novel shaft seal construction utilizing a metal insert which functions to restrict deflection properties of the elastomer in a radial direction without adversely affecting flexibility in an axial direction, in-service distortion and destruction of the elastomer from valve cycling is precluded. Not only is the shaft protected in this manner but with both seals in place they effectively operate to provide concentric centering of the vane relative to the thru-port of passage 12. Moreover, since the bearing surfaces thereat are likewise protected by the seals, the possibility of shaft freezing from clearance plugging by the line content is substantially if not completely eliminated while extending bearing life to the maximum from a permanent lubrication thereof. With the seals being situated about the stub shafts between the vane hubs and body hubs and completely flexible in an axial direction, a relatively simple feature has contributed significantly both to a reduction of manufacturing costs and operating life for such valves relatively free of maintenance. Whereas the invention has been described herein as particularly useful in offset or double offset valves of the butterfly type, it should be readily apparent that it can be utilized elsewhere in other valve types for which similar benefits are to be sought.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a rotatably operable pipe line valve for corrosive service including a metal body defining a flow passage between an inlet and an outlet, a closure member in said passage operable between open and closed positions thereof, a thruport seal in said passage for cooperating with said closure member in its closed position and an operator shaft extending through said body from a driving connection internally enclosed within said closure member to a location external of said body, an annular seal member surrounding said shaft in axially squeezed relation interposed between said closure member and said body thereat, said seal member being operably effective for shaft protection against line content independent of said thruport seal and comprising an elastomer and deflection control means operative against said elastomer to restrict radial deflection thereof.

2. In a valve according to claim 1 in which said deflection control means comprises a rigid support secured internally to said elastomer.

3. In a valve according to claim 2 in which said rigid support comprises an elongated metal insert bonded to said elastomer at a location internally of said elastomer affording line content exposure protection thereto.

4. In a valve according to claim 3 in which said valve comprises a butterfly valve, said closure member comprises a rotatable vane and said operator shaft is rotatable for operating said vane between said open and closed positions.

5. In a valve according to claim 4 in which said closure member is trunnion mounted and there is included a second shaft aligned in said body diametrically opposite the operator shaft and a second said annular seal member surrounding said second shaft in an axially squeezed relation intervening between said closure member and said body thereat.

6. In a valve according to claim 5 in which said seal member in its natural state is of cross section which decreases in axial dimension from its periphery toward its center.

7. In a valve according to claim 6 in which said natural axial dimension of said seal member at its periphery significantly exceeds the squeeze dimension when assembled in said valve.

8. In a valve according to claim 7 in which said seal member includes a circumferential surface of predetermined contour exposed to said flow passage for rendering said seal member self-packing in response to the pressure of line content in said passage.

9. In a valve according to claim 8 in which said surface contour in an axial direction is comprised of alternately changing surface diameters.

10. In a valve according to claim 9 in which at least the body and vane surface portions contiguous to said seal members include a coating of polymeric composition, and said seal members are axially squeezed in engagement against said coatings.

* * * * *